(12) United States Patent
Kehmna et al.

(10) Patent No.: US 9,500,103 B2
(45) Date of Patent: Nov. 22, 2016

(54) DUCT FIRED COMBINED CYCLE SYSTEM

(71) Applicant: General Electric Company, Schenectady, NY (US)

(72) Inventors: Mark David Kehmna, Schenectady, NY (US); Seyfettin Can Gulen, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 527 days.

(21) Appl. No.: 13/972,960

(22) Filed: Aug. 22, 2013

(65) Prior Publication Data
US 2015/0052906 A1    Feb. 26, 2015

(51) Int. Cl.
| F01K 23/10 | (2006.01) |
|---|---|
| F01K 7/22 | (2006.01) |
| F22B 1/18 | (2006.01) |
| F01K 23/06 | (2006.01) |
| F01K 7/40 | (2006.01) |

(52) U.S. Cl.
CPC .............. *F01K 23/06* (2013.01); *F01K 7/22* (2013.01); *F01K 7/40* (2013.01); *F01K 23/103* (2013.01); *F01K 23/105* (2013.01); *F22B 1/1861* (2013.01); *Y02E 20/16* (2013.01)

(58) Field of Classification Search
CPC ......... F01K 7/22; F22B 1/1861; Y02E 20/14
See application file for complete search history.

(56) References Cited

U.S. PATENT DOCUMENTS

| 3,919,839 A * | 11/1975 | Aguet ................... F01K 23/10 122/7 R |
| 6,141,956 A * | 11/2000 | Iijima .................. F22B 1/1815 122/7 R |
| 6,230,480 B1 | 5/2001 | Rollins, III |
| 6,244,033 B1 | 6/2001 | Wylie |
| 2003/0131601 A1 * | 7/2003 | Baxter .................. F01K 23/105 60/772 |
| 2007/0017207 A1 | 1/2007 | Smith et al. |
| 2007/0130952 A1 * | 6/2007 | Copen ..................... F02C 6/02 60/772 |
| 2007/0240400 A1 | 10/2007 | Smith et al. |
| 2009/0090111 A1 | 4/2009 | Tomlinson et al. |
| 2010/0305768 A1 * | 12/2010 | Holt ....................... F01K 13/02 700/288 |
| 2011/0079017 A1 | 4/2011 | Gulen et al. |
| 2011/0088404 A1 | 4/2011 | Gulen |
| 2011/0100004 A1 * | 5/2011 | Al-Mazeedi ......... G05B 13/021 60/641.8 |
| 2012/0055157 A1 | 3/2012 | Gulen et al. |
| 2012/0317973 A1 | 12/2012 | Gulen |
| 2013/0000272 A1 | 1/2013 | Gulen et al. |

OTHER PUBLICATIONS

U.S. Appl. No. 13/603,463, filed Sep. 5, 2012, Kim, et al.

* cited by examiner

*Primary Examiner* — Phutthiwat Wongwian
*Assistant Examiner* — Rene Ford
(74) *Attorney, Agent, or Firm* — Sutherland Asbill & Brennan LLP

(57) ABSTRACT

The present application provides a combined cycle system. The combined cycle system may include a heat recovery steam generator with a first low pressure section and a second low pressure section, a steam turbine with a low pressure steam section in communication with the second low pressure section of the heat recovery steam generator, and a duct burner positioned upstream of the heat recovery steam generator.

1 Claim, 2 Drawing Sheets

DUCT FIRED COMBINED CYCLE SYSTEM

TECHNICAL FIELD

The present application and the resultant patent relate generally to a combined cycle power plant and more particularly relate to supercritical duct fired combined cycle system with stack temperature controls via an additional heat recovery steam generator section and/or revised superheater positioning.

BACKGROUND OF THE INVENTION

Generally described, a combined cycle power generation system uses a combination of a gas turbine and a steam turbine to produce electrical power or otherwise to drive a load. Specifically, a gas turbine cycle may be operatively combined with a steam turbine cycle by way of a heat recovery steam generator and the like. The heat recovery steam generator may be a multi-section heat exchanger that allows feedwater for the steam generation process to be heated by the hot combustion gases of the gas turbine exhaust. The primary efficiency of the combined cycle system arrangement is the utilization of the otherwise "wasted" heat of the gas turbine exhaust. Power plant operators thus aim to generate the maximum possible useful work from the heat in the gas turbine exhaust.

Power plant operators are also interested in fuel flexibility. A conventional gas turbine combined cycle power plant, however, generally may be less efficient when operating on, for example, heavy fuel oil or fuels other than natural gas. The loss of efficiency due to the use of heavy fuel oils, however, may be limited by the addition of duct burning. Duct burning increases the exhaust temperatures so as to enable a supercritical steam cycle with steam at higher temperatures and higher pressures. Although the overall efficiency may improve, the high temperatures produced by such a supercritical cycle may be too high for the heat recovery steam generator to extract all the available energy from the hot exhaust gas stream passing therethrough.

Additional temperature limitations also may be imposed by the structure of the heat recovery steam generator itself. If certain temperatures are exceeded, expensive water cooled walls may become necessary. Because of this temperature limit, the amount of fuel that can be burned in a single duct burner stage may be limited. Placing the duct burner in a colder location may allow additional fuel to be burned but this positioning may expose the last sections of a high pressure superheater to unfired gas turbine exhaust. Moreover, if the turbine is producing relatively cold exhaust, this positioning may prevent a high pressure superheater section from producing steam at the desired temperature. This problem may be addressed by using multiple duct burner stages, but these additional stages add additional cost and complexity to the overall duct burner system. For example, a duct burner requires a significant length between the flame and the first superheater for a uniform flow of the combustion gases. Using a second row of duct burners would require additional heat recovery steam generator length as compared to a single burner duct design.

There is thus a desire for an improved duct fired combined cycle system with overall temperature controls. Such a system may allow the use of alternative fuels in an efficient manner but without requiring costly upgrades to the heat recovery steam generator and other components

SUMMARY OF THE INVENTION

The present application and the resultant patent thus provide a combined cycle system. The combined cycle system may include a heat recovery steam generator with a first low pressure section and a second low pressure section, a steam turbine with a low pressure steam section in communication with the second low pressure section of the heat recovery steam generator, and a duct burner positioned upstream of the heat recovery steam generator.

The present application and the resultant patent further provide a method of operating a combined cycle system. The method may include the steps of flowing combustion gases through a high pressure section, an intermediate pressure section, a first low pressure section, and a second low pressure section of a heat recovery steam generator, flowing feedwater from a condenser of a steam turbine to the second low pressure section of the heat recovery steam generator, exchanging heat between the flow of combustion gases and the flow of feedwater in the second low pressure section of the heat recovery steam generator, and flowing the heated feedwater to a low pressure section of the steam turbine.

The present application and the resultant patent further provide a heat recovery steam generator for a combined cycle system. The heat recovery steam generator may include a high pressure section with a first high pressure superheater and a second high pressure superheater and a duct burner. The first high pressure superheater may be positioned upstream of the duct burner.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
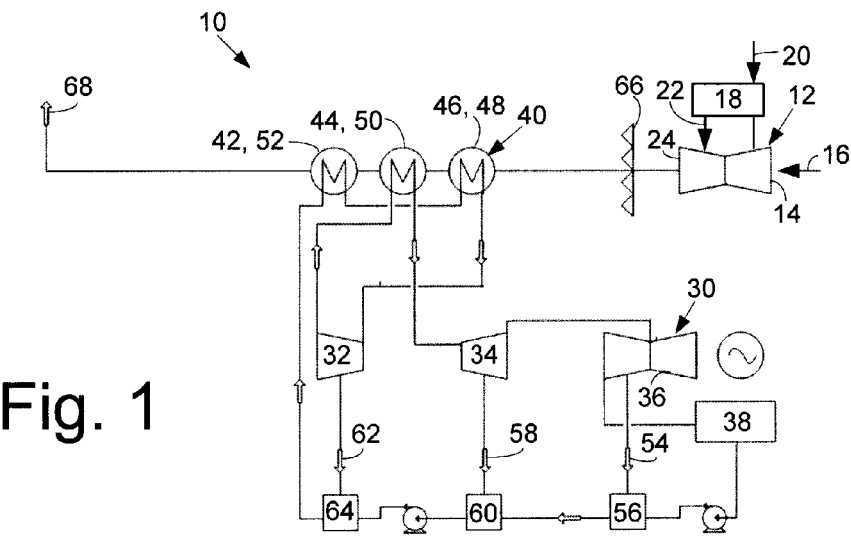
FIG. 1 is a schematic diagram of a known combined cycle system with a gas turbine, a steam turbine, and a heat recovery steam generator.

Referring now to the drawings, in which like numerals refer to like elements throughout the several views, FIG. 1 shows a schematic diagram of a combined cycle system 10. The combined cycle system 10 may include a gas turbine engine 12. The gas turbine engine 12 may include a compressor 14. The compressor 14 compresses an incoming flow of air 16. The compressor 14 delivers the compressed flow of air 16 to a combustor 18. The combustor 18 mixes the compressed flow of air 16 with a pressurized flow of fuel 20 and ignites the mixture to create a flow of combustion gases 22. Although only a single combustor 18 is shown, the gas turbine engine 12 may include any number of combustors 18. The flow of combustion gases 22 is in turn delivered to a turbine 24. The flow of combustion gases 22 drives the turbine 24 so as to produce mechanical work. The mechanical work produced in the turbine 24 drives the compressor 14 via a shaft and an external load such as an electrical generator and the like. The gas turbine engine 12 may use natural gas or various types of alternative fuels such as syngas, heavy fuel oils, and other types of fuels. The gas turbine engine 12 may have different configurations and may use other types of components.

The combined cycle system 10 also includes a steam turbine 30. The steam turbine 30 may include a number of sections with multiple steam admission points at different pressures. Specifically, the steam turbine 30 may include a high pressure steam section 32, an intermediate pressure steam section 34, and one or more low pressure steam sections 36. The low pressure steam section 36 may exhaust feedwater into a condenser 38. The steam turbine 30 may drive the same or a different load as the gas turbine 12. In this example, the steam turbine 30 may be a conventional fossil steam turbine design with a number of feedwater extractions. A low pressure extraction 54 may be extracted to a first feedwater heater 56, an intermediate pressure extraction 58 may be extracted to a second feedwater heater 60, and a high pressure extraction 62 may be extracted to a third feedwater heater 64. Other configurations and other components also may be used herein.

The combined cycle system 10 may include a heat recovery steam generator 40. The heat recovery steam generator 40 also may include a number of steam sections such as a low pressure section 42, an intermediate pressure section 44, and a high pressure section 46. Each section 42, 44, 46 generally includes one or more drums, economizers, evaporators, superheaters, and/or additional components. In this example, and in addition to other components, the high pressure section 46 may include a source of high pressure steam such as a high pressure superheater 48, the intermediate pressure section 44 may include a reheater 50, and the low pressure section 42 may include a source of low pressure steam such as a once through boiler 52. Other components and other configurations may be used herein.

In order to raise the temperature of the combustion gases 22 flowing through the heat recovery steam generator 40, one or more duct burners 66 may be used to improve the efficiency of the super critical steam cycle. The duct burners 66 may burn any type of fuel, including heavy fuel oils and the like. The combination of the duct burners 66 and the feed water heaters 56, 60, 64 generally results in high temperatures at the exhaust stack 68 of the heat recovery steam generator 40. Other components and other configurations may be used herein.

Figure 2:
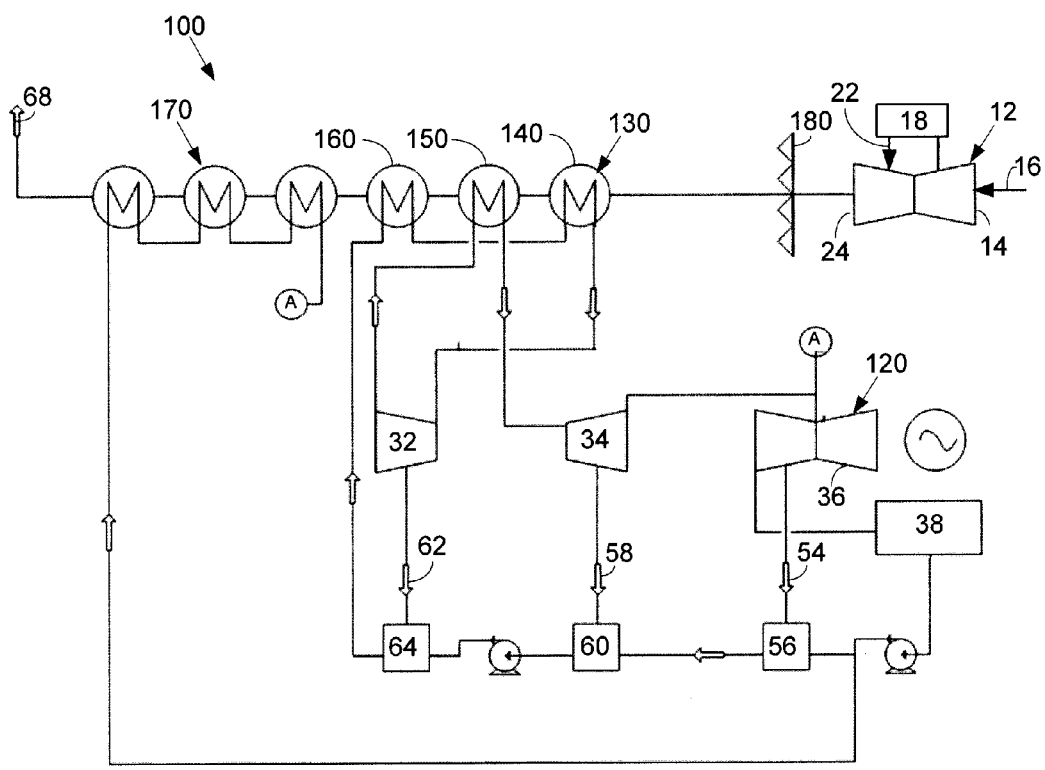
FIG. 2 is a schematic diagram of a combined cycle system as may be described herein.

FIG. 2 shows a combined cycle system 100 as may be described herein. The combined cycle system 100 may include a gas turbine engine 110, a steam turbine 120, and a heat recovery steam generator 130 that may be substantially similar to those described above. In this example, however, the heat recovery steam generator 130 may include a high pressure section 140, an intermediate pressure section 150, a first low pressure section 160, and an additional second low pressure section 170. The second low pressure section 170 may have any number of heat exchange elements therein. The second low pressure section 170 may receive the flow of feedwater from the condenser 38. This cooler water may be warmed by heat exchange with the combustion gases 22 flowing through the heat recovery steam generator 130. This flow of water then may be directed to the low pressure steam section 36 of the steam turbine 120. The second low pressure section 170 thus extracts additional useful energy from the combustion gases 22 that can be added to the low pressure section 36 of the steam turbine 120 and/or lower stack temperatures may be required. The energy would be otherwise wasted in the exhaust stack 68. Moreover, by adjusting the duty of the feedwater heaters 56, 60, 64, the exhaust stack temperature may be adjusted to respond to changes in fuel requirements.

The combined cycle system 100 further adds the use of a duct burner 180 similar to that described above. The duct burner 180 provides an efficient supercritical cycle to produce steam at higher temperatures and pressures for increased efficiency. The second low pressure section 170 thus makes use of this energy and applies the additional low pressure steam to the steam turbine 120. Moreover, by controlling the exhaust temperatures at the stack 68, the combine cycle system may adjust the overall operational strategy to extract the maximum amount of energy out of the exhaust stream without exceeding temperature limitations imposed by fuel chemistry in that the use of different fuels may result in differing optimal temperatures.

Figure 3:
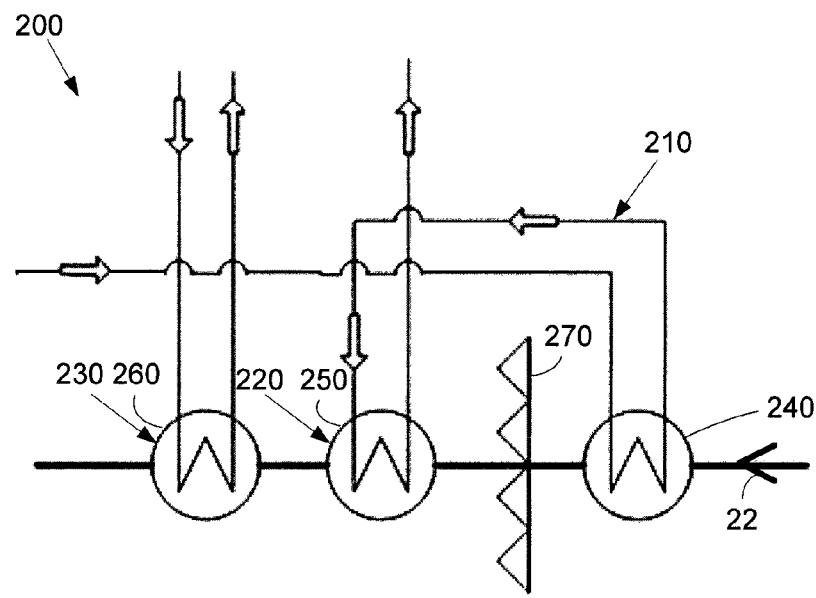
FIG. 3 is a schematic diagram of a further embodiment of a combined cycle system as may be described herein.

FIG. 3 shows a further embodiment of a combined cycle system 200. The combined cycle system 200 may largely include the components described above but with an alternative heat recovery steam generator 210. The heat recovery steam generator 210 may include a high pressure section 220 and an intermediate pressure section 230. In the traditional configuration, the high pressure section 220 includes a first high pressure superheater 240 and a second high pressure superheater 250 while the intermediate pressure section 230 includes a reheater 260. The high pressure superheaters 240, 250 are usually positioned on either side of the reheater 260 with the second high pressure superheater 250 closest to a duct burner 270.

In this example, however, the first high pressure superheater 240 may be positioned upstream of the duct burner 270 such that the higher temperature superheater 250 is directly downstream of the duct burner 270. By moving the first high pressure superheater 240 upstream of the duct burner 270, the first high temperature superheater 240 may cool the exhaust gases 22 before the exhaust gases reach the duct burner 270. This positioning thus allows the duct burner 270 to burn additional fuel without exceeding the temperature limitations of the heat recovery steam generator 210. Moreover, positioning the second high pressure superheater 250 immediately downstream of the duct burner 270 also allows for the production of higher temperature steam so as to improve overall cycle efficiency. Specifically, this positioning allows higher temperature gases to reach the high pressure boiler so as to result in greater high pressure steam production. Further, this positioning also eliminates the need for any more than a single row of duct burners so as to reduce the overall cost and size of the heat recovery steam generator 210. Other components and other configurations may be used herein.

Figure 4:
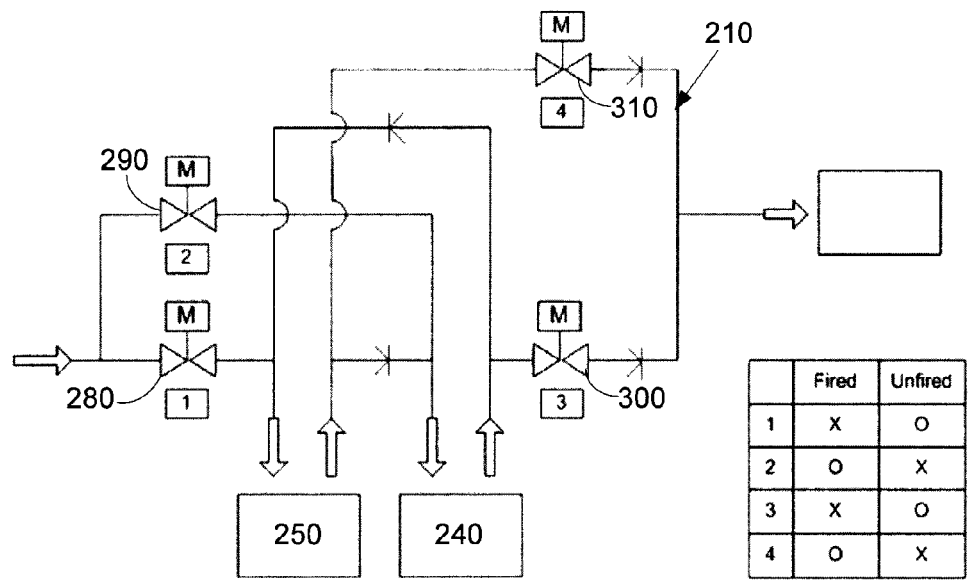
FIG. 4 is a schematic diagram of a valve configuration for a heat recovery steam generator of the combined cycle system of FIG. 3.

Because the combined cycle system 200 may operate without the duct burners 270 being active, a set of valves may be included to allow the superheater sections to operate in a conventional manner. FIG. 4 thus shows the use of a first valve 280, a second valve 290, a third valve 300, and fourth valve 310. When the duct burner 270 is unfired, the first valve 280 and the third valve 300 may be opened such that the flow of steam goes to the second high pressure superheater 250, to the first high pressure superheater 240, and to the high pressure turbine. In a fired mode, the second valve 290 and the fourth valve 310 may be opened such that the flow of steam goes to the first high pressure superheater 240, to the second high pressure superheater 250, and to the high pressure turbine. Any number of the valves may be used herein in any configuration. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A heat recovery steam generator for a combined cycle system, comprising:
   a high pressure section comprising a first high pressure superheater and a second high pressure superheater;
   an intermediate pressure section comprising a reheater;
   a duct burner;
   a steam conduit in communication with the first high pressure superheater and the second high pressure superheater; and
   a first set of valves and a second set of valves disposed on the steam conduit, wherein when the duct burner is unfired the first set of valves are open and the second set of valves are closed such that a flow of steam in the steam conduit is directed to the first high pressure superheater and then to the second high pressure superheater, and wherein when the duct burner is fired the second set of valves are open and the first set of valves are closed such that the flow of steam is directed to the second high pressure superheater and then to the first high pressure superheater;
   wherein the first high pressure superheater is positioned upstream of the duct burner, wherein the second high pressure superheater is positioned immediately downstream of the duct burner, wherein the reheater is positioned immediately downstream of the second high pressure superheater.

* * * * *